Aug. 20, 1929.  L. HÄRTER  1,725,733

DETACHABLE WHEEL RIM

Filed May 21, 1927

Inventor:
Ludwig Härter.

Patented Aug. 20, 1929.

1,725,733

UNITED STATES PATENT OFFICE.

LUDWIG HÄRTER, OF DRESDEN, GERMANY.

DETACHABLE WHEEL RIM.

Application filed May 21, 1927, Serial No. 193,353, and in Germany April 21, 1927.

My present invention relates to a vehicle wheel rim forming with the rubber tire thereon a detachable unit, and incorporating means whereby with minimum manipulation it may be secured to or detached from a cylindrical wheel felly.

A wheel rim according to my present invention comprises a carrier ring or foundation band the inner periphery of which is formed with two female conical surfaces, the diameter of which diminishes from the central plane transverse to the axis towards the edges, and an externally coned binding ring mated with the double female cone thus presented, said binding ring having a cylindrical internal periphery to fit the wheel felly, the said binding ring being split to form segments, and the carrier ring being divided transversely of the axis; said rings being interconnected by screw studs or the like by turning which the halves of the divided ring are moved axially towards or away from one another.

The double wedge action, namely the action of the helical wedges presented by the screw threads and the wedge action of the mating coned rings occasions with little expenditure of power a very effective fastening of the rim so constituted to the wheel felly.

As the internal periphery of the binding ring is cylindrical a complete rim with tire can be fitted to a wheel contrived to receive any of the usual forms of detachable rims pushed on from the side.

To prevent the ingress of dirt and water the carrier ring is formed at its edges with inturned flanges embracing the binding ring and engageable by the studs. As the studs traverse the binding ring, there are no loose parts when the rim with tire is detached from the wheel.

The binding ring is preferably of a material calculated to withstand compression and frictional stresses and having a high coefficient of friction. Preferably the binding ring is of metallized asbestos, say ferodo asbestos.

Figure 1:
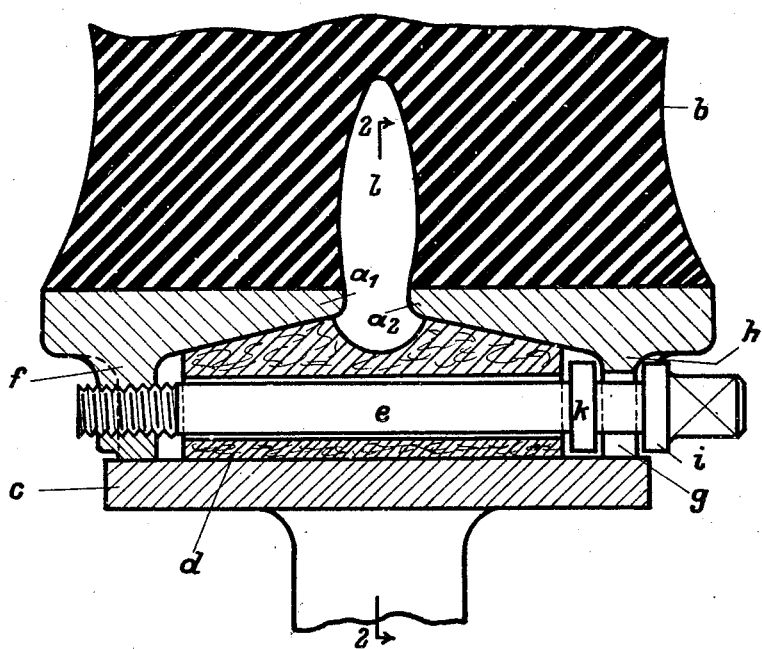
Figure 2:
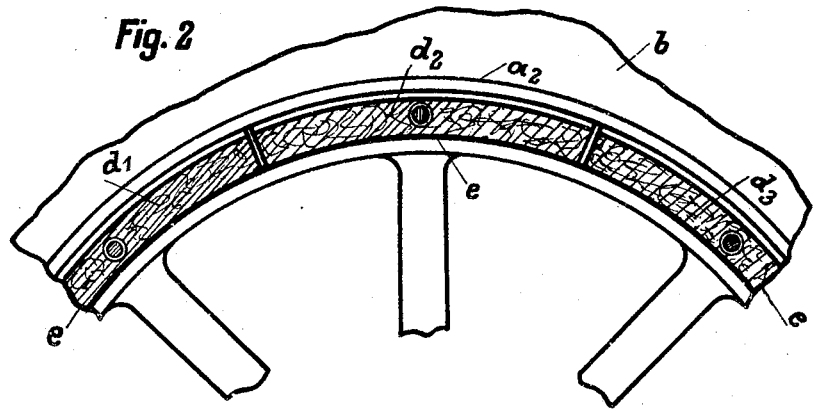

In the accompanying drawing which illustrates an embodiment of my invention, by way of example, Fig. 1 is an axial section showing the wheel rim with tire and attachment means; Fig. 2 is a part radial section on the line 2—2 of Fig. 1.

The internal peripheral half-surfaces of the carrier ring are of female conical form, the diameter of these cones diminishing from the central plane transverse to the axis towards the edges. Fixed to the carrier ring is the rubber tire $b$. Between the ring halves $a^1$, $a^2$ and the wheel felly $c$ is the binding ring $d$, preferably of ferodo asbestos, and built up of segments $d^1$, $d^2$, $d^3$ etc. The outer periphery of the binding ring is coned to mate with the carrier ring. Each segment of the ring $d$ is carried by a screw stud $e$ the threaded end of which engages the flange $f$ of the half-ring $a^1$, the other half-ring $a^2$ being slotted as at $g$ to accommodate the studs which are provided with collars $i$, $k$ embracing the flange $h$ so that the half ring $a^2$ is axially moved with the studs. The flanges $f$ and $h$ form with the wheel felly an enclosure or housing for the binding ring. On turning the studs to the right the rim with tire is tightly secured to the wheel with compression of the binding ring. To detach the rim a few left hand turns of the studs suffice.

As will be seen neither dirt nor water has access to the cavity $l$ of the tire.

As the said binding ring consists of asbestos and non-rusting metal, there is no risk of the rim rusting on to the wheel so as to interfere with its detachability.

What I claim as my invention and desire to secure by Letters Patent of the United States is:—

1. A detachable vehicle wheel rim, comprising, in combination, a carrier ring for a tire, said ring being formed with two female conical surfaces the diameter of which diminishes from the central plane transverse to the axis towards the edges, a binding ring consisting of metallized asbestos and being externally coned to mate with said carrier ring, said binding ring having a cylindrical internal periphery and being adapted to become contracted, one of said rings being divided transversely of the axis into two parts, and screw studs engaging said ring parts and adapted to axially move said ring parts so as to cause said cones to interengage, whereby said binding ring is contracted.

2. A detachable vehicle wheel rim, comprising, in combination, a carrier ring for a tire and consisting of two halves. said carrier ring being formed with two female conical surfaces the diameter of each diminishing from the central plane transverse to the axis towards the respective edge, a binding ring of a compressible material and being externally coned to mate with said carrier ring, said binding ring having a cylindrical internal periphery and being adapted to become contracted, a flange on each of said carrier ring halves and extending radially inwards in such a way that both flanges form a housing for said binding ring, and screw studs engaging said flanges of said carrier ring halves and adapted to axially move said ring halves so as to cause said cones to interengage, whereby said binding ring is contracted.

LUDWIG HÄRTER.